United States Patent
Sellers

(10) Patent No.: US 7,518,336 B2
(45) Date of Patent: Apr. 14, 2009

(54) BATTERY PACK EVENT-PROOF MONITORING AND ANALYSIS SYSTEM AND METHOD

(75) Inventor: Charles Sellers, Houston, TX (US)

(73) Assignee: Helwett-Packard Development Company, L.P., Houston, TX (US)

( * ) Notice: Subject to any disclaimer, the term of this patent is extended or adjusted under 35 U.S.C. 154(b) by 577 days.

(21) Appl. No.: 10/897,246

(22) Filed: Jul. 22, 2004

(65) Prior Publication Data

US 2006/0028173 A1  Feb. 9, 2006

(51) Int. Cl.
  *H01M 10/46* (2006.01)
(52) U.S. Cl. ..................................... 320/107
(58) Field of Classification Search ................. 320/107, 320/112; 429/96, 97, 98, 99, 100; D13/103
  See application file for complete search history.

(56) References Cited

U.S. PATENT DOCUMENTS

| | | | |
|---|---|---|---|
| 5,587,924 A | 12/1996 | Rossi | |
| 5,652,500 A | 7/1997 | Kadouchi et al. | |
| 5,767,778 A * | 6/1998 | Stone et al. | 340/636.1 |
| 6,172,482 B1 | 1/2001 | Eguchi | |
| 6,522,361 B2 | 2/2003 | Higuchi et al. | |
| 6,549,014 B1 * | 4/2003 | Kutkut et al. | 324/426 |
| 2003/0217210 A1 | 11/2003 | Carau, Sr. | |
| 2004/0001996 A1 | 1/2004 | Sugimoto | |
| 2004/0059527 A1 * | 3/2004 | Kobayashi et al. | 702/63 |
| 2005/0285571 A1 * | 12/2005 | Grunert et al. | 320/128 |

* cited by examiner

*Primary Examiner*—Edward Tso

(57) ABSTRACT

A battery pack comprises an event monitoring system at least partially disposed in an event-proof enclosure of the battery pack. The event-proof enclosure is adapted to enable the event monitoring system to retain data acquired by the event monitoring system for analysis after occurrence of a service event of the battery pack.

25 Claims, 2 Drawing Sheets

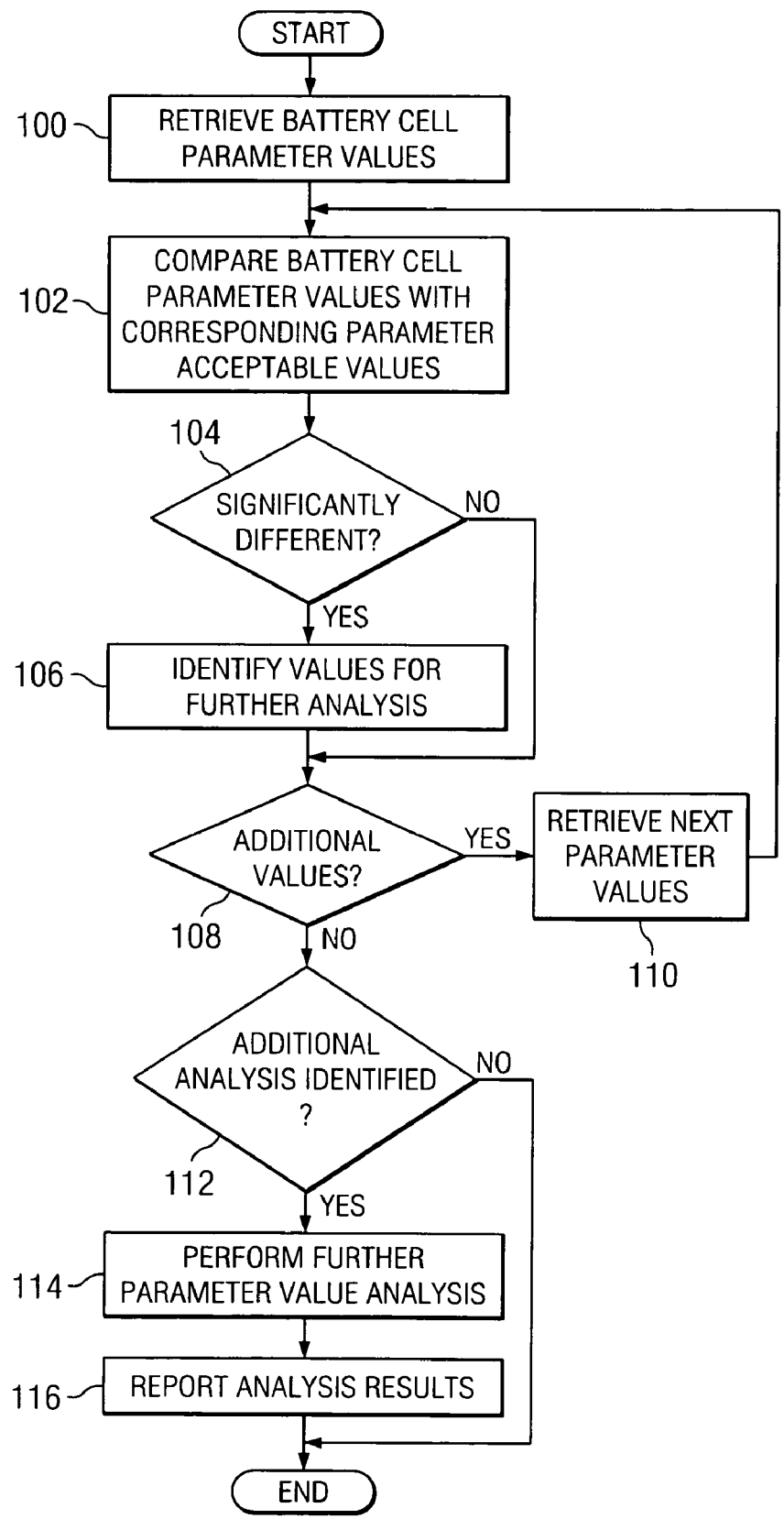

BATTERY PACK EVENT-PROOF MONITORING AND ANALYSIS SYSTEM AND METHOD

BACKGROUND

Portable electronic devices are generally configured to utilize a battery pack as a sole or alternate source of power. However, if a battery pack fails, the cause of the failure is generally difficult or impossible to determine. For example, a battery pack failure is generally accompanied by, or is a result of, an explosion, fire, or chemical leak. Thus, diagnosing battery pack failures and improving battery pack design remains a difficult task.

SUMMARY

In accordance with an embodiment of the present invention, a battery pack comprises an event monitoring system at least partially disposed in an event-proof enclosure of the battery pack. The event-proof enclosure is adapted to enable the event monitoring system to retain data acquired by the event monitoring system for analysis after occurrence of a service event of the battery pack.

In accordance with another embodiment of the present invention, a battery pack event monitoring method comprises monitoring at least one parameter associated with at least one battery cell of the battery pack. The method also comprises storing a value of the at least one parameter in a memory disposed in an event-proof enclosure of the battery pack where the event-proof enclosure enables an event monitoring system to retain the parameter value after occurrence of a service event of the battery pack.

In accordance with yet another embodiment of the present invention, a battery pack event analysis system comprises a diagnostic system communicatively coupled to a memory of a battery pack where the memory has at least one value associated with a battery cell parameter of the battery pack stored therein, and the diagnostic system is operable to analyze the at least one stored value to determine at least one cause of a service event of the battery pack.

BRIEF DESCRIPTION OF THE DRAWINGS

For a more complete understanding of the present invention, the objects and advantages thereof, reference is now made to the following descriptions taken in connection with the accompanying drawings in which:

FIG. 4 is a flow diagram illustrating an embodiment of a battery pack event analysis method in accordance with the present invention.

DETAILED DESCRIPTION OF THE DRAWINGS

The preferred embodiment of the present invention and its advantages are best understood by referring to FIGS. 1 through 4 of the drawings.

Figure 1:
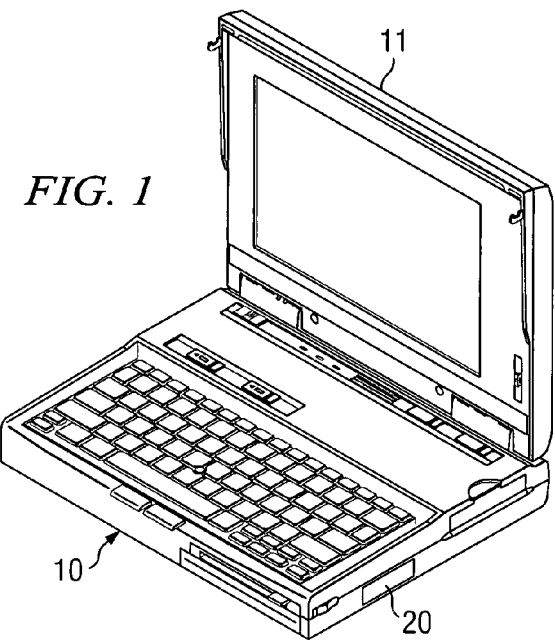
FIG. 1 is a pictorial representation of an electronic device in which a battery pack of the present invention may be employed.

FIG. 1 is a diagram illustrating an electronic device 10 in which a battery pack 20 in accordance with the present may be employed. In FIG. 1, electronic device 10 comprises a laptop or notebook computer 11. However, it should be understood that battery pack 20 may be used in any type of electronic device such as, but not limited to, a personal digital assistant, a camera, hard drives, peripheral devices, a cellular phone, and/or a portable printer.

Figure 2:
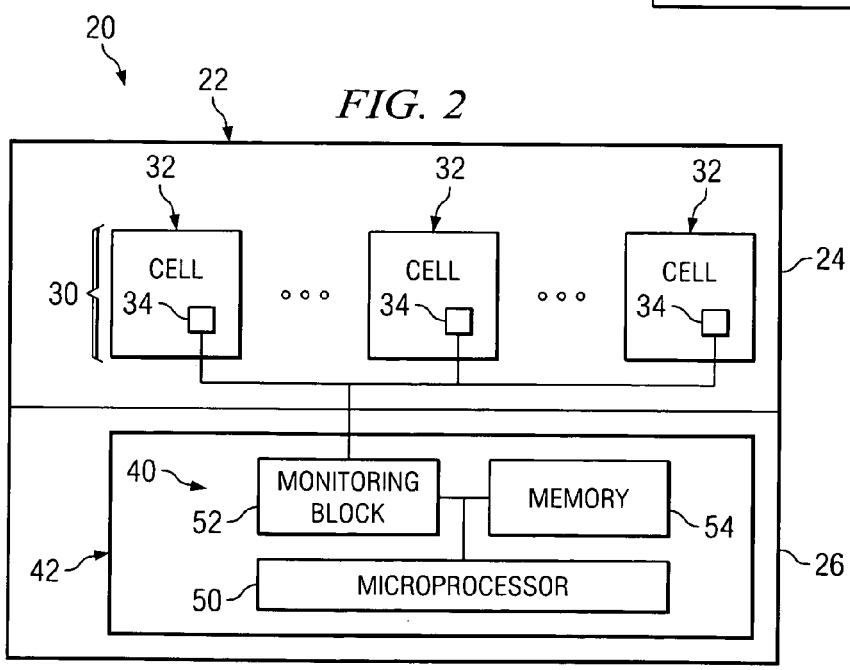
FIG. 2 is a block diagram illustrating an embodiment of a battery pack in accordance with the present invention.

FIG. 2 is a block diagram illustrating an embodiment of battery pack 20 in accordance with the present invention. In the embodiment illustrated in FIG. 2, battery pack 20 comprises a housing 22 divided into a plurality of compartments 24 and 26. In FIG. 2, battery pack 20 comprises two compartments; however, it should be understood that battery pack 20 may be configured with a greater quantity of compartments. In the embodiment illustrated in FIG. 2, compartment 24 comprises a power supply system 30. For example, in the embodiment illustrated in FIG. 2, power supply system 30 comprises at least one battery cell 32. Battery cell 32 comprises any type of battery cell now known or later developed. In the embodiment illustrated in FIG. 2, a sensor 34 is associated with each battery cell 32. If desired, a plurality of sensors 34 may be associated with each battery cell 32. In operation, sensor 34 measures or otherwise monitors at least one battery cell parameter such as, but not limited to, charge level, charge rate, discharge rate, temperature, battery cell balance, and/or a physical dimension of the associated battery cell 32. The measured physical dimension of the associated battery cell 32 may be height, length, width, or diameter of the battery cell 32. For a particular battery cell 32, the same sensor 34 may be configured or adapted to measure a plurality of battery cell parameters or a single battery cell parameter. In some embodiments of the present invention, the same battery cell parameter is measured for each battery cell 32. If desired, different battery cell parameters may be measured for different battery cells 32.

In the embodiment illustrated in FIG. 2, compartment 26 comprises an event monitoring system 40 disposed within an event-proof enclosure 42. In FIG. 2, enclosure 42 is illustrated as a separate structure apart from structure forming compartment 26; however, it should be understood that enclosure 42 and compartment 26 may be configured as a single structure. In operation, event-proof enclosure 42 is configured to withstand or survive a service or failure event such as, but not limited to, fire, explosion, and/or a chemical leak. For example, in some embodiments of the present invention, enclosure 42 is formed of a rigid, high-strength material, such as steel, combined with insulating and/or fire-resistant materials. However, it should be understood that other metallic and/or non-metallic materials may be used to form enclosure 42. Thus, in operation, event-proof enclosure enables retention of data acquired by event-monitoring system 40 after the occurrence of a service or failure event, thereby enabling analysis of the retained data for event cause. As used herein, a service or failure event comprises any event affecting the continued performance and/or operation of battery pack 20 in accordance with normal operating parameters.

In the embodiment illustrated in FIG. 2, event monitoring system 40 comprises a microcontroller 50 communicatively coupled to a monitoring block 52 and a memory 54. Memory 54 comprises a non-volatile memory to enable retention of data stored therein, for example values of battery cell parameters. Monitoring block 52 is communicatively coupled to battery cell(s) 32 and is adapted to monitor and receive battery cell parameter(s) data from sensor(s) 30 and transmit the battery cell parameter data to memory 54 for storage. In operation, because event monitoring system 40 is disposed within event-proof enclosure 42, event monitoring system 40 withstands or survives the occurrence of a service or failure event such as, but not limited to, fire, an explosion, and/or a chemical leak. Therefore, in the event of a service or failure event, parameter data from memory 54 may be retrieved and analyzed to determine the cause of the event. In the embodiment illustrated in FIG. 2, monitoring block 52, microcontroller 50, and memory 54 are disposed within event-proof enclosure 42. However, it should be understood that in other embodiments of the present invention, portions of event monitoring system 40 may reside outside or external to event-proof enclosure 42. For example, in some embodiments of the present invention, only memory 54 is disposed within event-proof enclosure 42 such that, in the event of a service or failure event, parameter data stored in memory 54 may be later retrieved for analysis. As another example, in other embodiments of the present invention, only monitoring block 52 and microprocessor 50 are disposed within event-proof enclosure 42 such that, in the event of a service or failure event, information corresponding to the event is transmitted to a memory device located elsewhere.

In some embodiments of the present invention, in operation, during battery pack 20 charging or while battery pack 20 is supplying power to electronic device 10, sensor(s) 34 monitor and/or measure at least one battery cell parameter of the battery cell 32 with which it is associated. Microcontroller 50 controls monitoring block 52 and periodically instructs or otherwise causes monitoring block 52 to read or receive the values of the battery cell parameters from sensor(s) 34. Values of the battery cell parameters are recorded or stored in memory 54. The size of memory 54 is selected so that it is capable of storing data, for example values of the battery cell parameters, read over a predetermined time period, for example five minutes. However, it should be understood that the predetermined time period may be shorter or longer. Because memory 54 is of finite capacity, data in memory 54 is periodically purged or overwritten. In an exemplary embodiment, memory 54 comprises a first-in-first-out memory such that the oldest data in memory 54 is purged or overwritten. Thus, in operation, memory 54 is adapted to store and retain the most recent values for the battery cell parameters for the predetermined time period. Additionally, it should be understood that battery pack 20 may be configured to monitor and/or measure battery cell parameters at times other than during charging or supplying power.

In some embodiments of the present invention, at least one battery parameter comprising a physical dimension, for example the diameter, of battery cell(s) 32 is monitored and the value of the monitored physical dimension is periodically stored in memory 54. Because the physical dimension of battery cell(s) 32 increases with temperature, by measuring and monitoring the physical dimension, the rate of temperature change of battery pack 20 may be determined. Furthermore, because the space in battery pack 20 is limited, physical expansion of one or more of the battery cells 32 may cause the housing of the battery cell 32 to rupture, thereby causing chemicals from inside the battery cell 32 to leak and cause a service event or failure of the battery cell 32 and/or battery pack 20. Thus, embodiments of the present invention enable retrieval of the physical dimension data from memory 54 within event-proof enclosure 42 to aid in the analysis of a service or failure event determination associated with battery pack 20.

Figure 3:
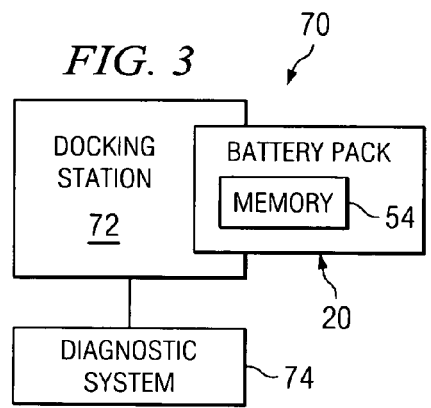
FIG. 3 is a block diagram illustrating an embodiment of a battery pack event analysis system in accordance with the present invention.

FIG. 3 is a block diagram illustrating an embodiment of a battery pack event analysis system 70 in accordance with the present invention. In the embodiment illustrated in FIG. 3, system 70 comprises a docking station 72 communicatively coupled to a diagnostic system 74. System 74 may be configured as a component or otherwise embodied within docking station 72 or may be configured as a separate system adapted to be coupled to docking station 72. Docking station 72 is configured to receive battery pack 20 and communicate with memory 54 and/or other components of battery pack 20. However, it should be understood that memory 54 may also be removed from battery pack 20 after a service or failure event such that data stored within memory 54 may be accessed and/or otherwise retrieved and analyzed for service or failure event determination. Diagnostic system 74 is configured to communicate with battery pack 20 and/or memory 54 to retrieve or otherwise access data stored in memory 54 and assist in performance of the analysis of the data. Diagnostic system 74 may be a processor-based system, for example, a computer, a personal digital assistant, and/or the like. Thus, in operation, diagnostic system 74 accesses memory 54 and/or otherwise communicates or interfaces with microprocessor 50 to access data stored in memory 54 to facilitate analysis of the data in memory 54.

FIG. 4 is a flow diagram illustrating an embodiment of a battery pack event analysis method in accordance with the present invention. The method begins at block 100, where values of battery cell parameters are retrieved or otherwise accessed from memory 54. For example, the stored values are retrieved from memory 54 by diagnostic system 74. At block 102, values of selected ones of the received battery cell parameters are compared with respective acceptable values for the battery cell parameters by diagnostic system 74. The acceptable values used by diagnostic system 74 comprise values or a range of values for each of the battery cell parameters monitored by monitoring block 52 (FIG. 2) corresponding to normal operating conditions of battery pack 20.

Referring to FIG. 4, at decisional block 104, a determination is made as to whether any of the values retrieved from memory 54 are significantly different from the respective acceptable values. For example, in some embodiments of the present invention, if any of the selected values differ from the respective acceptable values by a predetermined amount or percentage, then it is determined that at least one of the selected values is significantly different from the respective acceptable values. If at least one of the selected values is significantly different from the respective acceptable values, then the method proceeds to block 106, where the selected values are marked for further analysis to determine the cause of the battery pack event. If the selected values are not significantly different from the respective acceptable values, the method proceeds to decisional block 108.

At decisional block 108, a determination is made as to whether there are additional battery cell parameter values. If there are additional battery cell parameter values, then the method proceeds to block 110, where additional battery cell parameter values are retrieved or otherwise accessed from memory 54. The method proceeds to block 102 for analysis of the values. If there are no additional battery cell parameter values, the method proceeds to decisional block 112, where a determination is made as to whether the battery cell parameter values are to be further analyzed. For example, in some embodiments of the present invention, this determination is made by checking whether any of the battery cell parameter values are marked for further analysis (i.e., as in block 106). If the battery cell parameter values are not to be further analyzed, then the method terminates.

If further analysis of the received battery cell parameter values is desired, the method proceeds to block 114, where additional analysis of the battery cell parameter values are analyzed. For example, in some embodiments of the present invention, the battery cell parameter values for a predetermined time period are mapped corresponding to the time period. From the parameter mapping, the rate of change in the value of the battery cell parameters is determined. If the rate of change in the value of certain parameters, for example, charge rate, temperature and battery cell diameter, is above a certain threshold, then it may be determined that microcontroller 50 failed to properly control the battery cell charging rate, thereby possibly leading to a rupture of the battery cell housing and/or a fire or explosion. However, it should be understood that further analysis of the battery cell parameter values may be determinative of other battery pack service or failure events. It should also be understood that a variety of types of techniques may be used to analyze the data retrieved from memory 54. At block 116, the results of the analysis are conveyed to a user or other system or entity. For example, in some embodiments of the present invention, the results of the analysis are displayed on a display device associated with diagnostic system 74 or output to a printer or other type of output device.

Embodiments of the present invention may be implemented in software, hardware, application logic or a combination of software, hardware and application logic. The software, application logic and/or hardware may reside on battery pack 20 or diagnostic system 74. If desired, part of the software, application logic and/or hardware may reside on battery pack 20 and part of the software and/or hardware may reside on diagnostic system 74. The application logic, software or an instruction set is preferably maintained on any one of various conventional computer-readable mediums. In the context of this document, a "computer-readable medium" can be any means that can contain, store, communicate, propagate or transport the instructions for use by or in connection with an instruction execution system, apparatus, or device.

Thus, embodiments of the present invention enable monitoring and storing of battery pack parameter values for use in diagnosing and determining battery pack service or failure events. Additionally, embodiments of the present invention provide an event-proof enclosure 42 within or otherwise part of the battery pack 20 to maintain the integrity of the monitored and stored battery pack parameter values such that the data values may be retrieved or otherwise accessed in the event of a battery pack service or failure event. If desired, the different functions discussed herein may be performed in any order and/or concurrently with each other. Furthermore, if desired, one or more of the above-described functions may be optional or may be combined.

What is claimed is:

1. A battery pack, comprising:
an event monitoring system at least partially disposed in an event-proof enclosure of the battery pack, the event-proof enclosure adapted to enable the event monitoring system to retain data acquired by the event monitoring system for analysis after occurrence of a service event of the battery pack.

2. The battery pack of claim 1, wherein the event monitoring system comprises a memory disposed within the event-proof enclosure.

3. The battery pack of claim 1, wherein the event monitoring system is adapted to monitor at least one battery cell parameter value of the battery pack.

4. The battery pack of claim 1, wherein the event monitoring system is adapted to store in a memory disposed within the event-proof enclosure at least one battery cell parameter value of the battery pack.

5. The battery pack of claim 4, wherein the at least one battery cell parameter value comprises a physical dimension of at least one battery cell of the battery pack.

6. The battery pack of claim 1, wherein the event monitoring system is adapted to monitor at least one battery cell parameter value selected from the group consisting of a charge level, a charge rate, a discharge rate, and a temperature, of at least one battery cell of the battery pack.

7. The battery pack of claim 1, wherein the event-proof enclosure is adapted to enable the event monitoring system to retain the data after occurrence of a battery cell leak.

8. The battery pack of claim 1, wherein the event-proof enclosure is adapted to enable the event monitoring system to retain the data after occurrence of a flammable event.

9. The battery pack of claim 1, wherein the event-proof enclosure is adapted to enable the event monitoring system to retain the data after occurrence of an explosive event.

10. The battery pack of claim 1, wherein the event monitoring system comprises a monitoring block communicatively coupled to at least one battery cell of the battery pack.

11. The battery pack of claim 1, the event monitoring system comprising a memory sized to store data acquired for a predetermined period of time.

12. A battery pack event monitoring method, comprising:
monitoring at least one parameter associated with at least one battery cell of the battery pack; and
storing a value of the at least one parameter in a memory disposed in an event-proof enclosure of the battery pack, the event-proof enclosure adapted to enable an event monitoring system to retain the parameter value after occurrence of a service event of the battery pack.

13. The method of claim 12, wherein monitoring comprises monitoring at least one parameter selected from the group consisting of a charge level, a charge rate, a discharge rate, and a temperature, of the at least one battery cell.

14. The method of claim 12, further comprising analyzing the stored parameter value after occurrence of the service event to determine at least one cause of the service event.

15. The method of claim 12, further comprising automatically purging the parameter value after receipt of a predetermined quantity of values associated with the monitored parameter.

16. The method of claim 12, further comprising retrieving the value after the occurrence of the service event.

17. The method of claim 12, further comprising comparing, after occurrence of the service event, the value to an acceptable value corresponding to the parameter to determine at least one cause of the service event.

18. A battery pack, comprising:
means for monitoring at least one parameter associated with at least one battery cell of the battery pack; and
means for storing a value of the at least one parameter in a memory disposed in an event-proof enclosure of the battery pack, the event-proof enclosure adapted to enable the monitoring means to retain the parameter value after occurrence of a service event of the battery pack.

19. The battery pack of claim 18, wherein the means for monitoring comprises means for monitoring at least one parameter selected from the group consisting of a charge level, a charge rate, a discharge rate, and a temperature, of the at least one battery cell.

20. The battery pack of claim 18, further comprising means for automatically purging the value after receipt of a predetermined quantity of values associated with the monitored parameter.

21. A battery pack event analysis system, comprising:
a diagnostic system operable to analyze at least one value stored in a memory of a battery pack to determine at least one cause of a service event of the battery pack, the at least one value associated with a battery cell parameter of the battery pack.

22. The system of claim 21, the diagnostic system adapted to be communicatively coupled to the memory of the battery pack to access the at least one value.

23. The system of claim 21, the diagnostic system adapted to communicate with the memory of the battery pack via a docking station.

24. The system of claim 21, wherein the diagnostic system is adapted to retrieve the at least one value from the memory.

25. The system of claim 21, wherein the diagnostic system is adapted to compare the at least one stored value with an acceptable value corresponding to the battery cell parameter.

* * * * *

UNITED STATES PATENT AND TRADEMARK OFFICE
CERTIFICATE OF CORRECTION

PATENT NO. : 7,518,336 B2
APPLICATION NO. : 10/897246
DATED : April 14, 2009
INVENTOR(S) : Charles Sellers Page 1 of 1

It is certified that error appears in the above-identified patent and that said Letters Patent is hereby corrected as shown below:

Title pg, Item (73), "Assignee", delete "Helwett-Packard" and insert -- Hewlett-Packard --, therefor.

Signed and Sealed this

First Day of September, 2009

David J. Kappos
*Director of the United States Patent and Trademark Office*